United States Patent
Brooks Powell et al.

(10) Patent No.: US 10,694,331 B1
(45) Date of Patent: Jun. 23, 2020

(54) MOBILE DEVICE NAVIGATION WITH COUNTERPART DEVICE IDENTIFICATION

(71) Applicant: International Business Machines Corporation, Armonk, NY (US)

(72) Inventors: Natalie Brooks Powell, Bolingbrook, IL (US); Matthew E. Dirks, Mesa, AZ (US); Leah Michelle Camp, Monett, MO (US); Michael Bender, Rye Brook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/580,559

(22) Filed: Sep. 24, 2019

(51) Int. Cl.
H04W 24/00 (2009.01)
H04W 4/024 (2018.01)
H04W 4/02 (2018.01)

(52) U.S. Cl.
CPC ........... *H04W 4/024* (2018.02); *H04W 4/023* (2013.01)

(58) Field of Classification Search
USPC ....................................... 455/457; 701/129.4
See application file for complete search history.

(56) References Cited

U.S. PATENT DOCUMENTS

| 6,222,483 | B1 | 4/2001 | Twitchell et al. | |
|---|---|---|---|---|
| 9,494,439 | B1 | 11/2016 | Ross et al. | |
| 9,547,309 | B2 | 1/2017 | Ross et al. | |
| 9,807,250 | B2 | 10/2017 | Austin et al. | |
| 9,852,391 | B2* | 12/2017 | Al Rifai | G06Q 10/0834 |
| 2013/0054139 | A1* | 2/2013 | Bodin | G06Q 10/00 701/468 |
| 2013/0316735 | A1 | 11/2013 | Li et al. | |
| 2016/0189439 | A1* | 6/2016 | Vetterick | G07C 5/006 701/29.4 |
| 2016/0255472 | A1* | 9/2016 | Wise | H04W 4/023 455/457 |
| 2016/0275458 | A1* | 9/2016 | Meushar | G06Q 10/1095 |
| 2018/0108243 | A1* | 4/2018 | Scherer | G08B 21/24 |
| 2018/0245937 | A1* | 8/2018 | Moore | G01C 21/3492 |
| 2019/0065852 | A1* | 2/2019 | Badalamenti | H04B 17/373 |
| 2019/0103075 | A1* | 4/2019 | Magi | G09G 5/391 |
| 2019/0259182 | A1* | 8/2019 | Sarukkai | G06T 7/97 |

OTHER PUBLICATIONS

Michalevsky et al., "PowerSpy: Location Tracking using Mobile Device Power Analysis", 2017.
Ashbrook et al., "Using GPS to Learn Significant Locations and Predict Movement Across Multiple Users", College of Computing, Georgia Institute of Technology, 2017.
Ratti et al., "Mobile Landscapes: using location data from cellphones for urban analysis", 2017.
IP.com, "Stereo Audio Fingerprinting and Matching", Jun. 19, 201, IP.com at:https://ip.com/IPCOM/000237526.

* cited by examiner

*Primary Examiner* — David Q Nguyen
(74) *Attorney, Agent, or Firm* — Garg Law Firm, PLLC; Rakesh Garg; Brian Restauro

(57) ABSTRACT

A mutual navigation route is generated from a first to a second mobile devices, the mutual navigation route defining a route from one of the first and second mobile devices to another of the mobile devices. Responsive to determining that a predetermined threshold distance between the first and second mobile devices is reached, generating a first sensory cue at the first mobile device and a second sensory cue at the second mobile device, the first and second sensory cues being provided in counterpart.

19 Claims, 10 Drawing Sheets

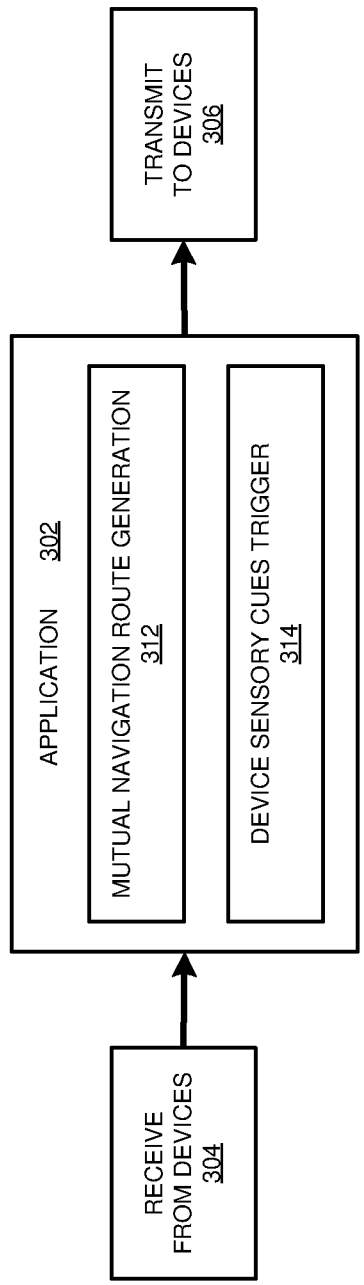

MOBILE DEVICE NAVIGATION WITH COUNTERPART DEVICE IDENTIFICATION

TECHNICAL FIELD

The present invention relates generally to a method, system, and computer program product for mobile device navigation. More particularly, the present invention relates to a method, system, and computer program product for mobile device navigation with identification of a counterpart mobile device.

BACKGROUND

Mobile devices, including mobile phones, are increasingly relied upon and used for user navigation purposes. In addition to typical stand-alone navigational uses, however, users may desire, under quite commonly experienced circumstances, to locate particular other users who carry mobile devices in a manner that enhances personal security and confidence. For example, family members who have become separated at a very crowded sports stadium while a game is in progress, a user requesting a ride without knowing the authenticity of one or more arrived drivers with proffered vehicles, users who may desire to meet another party or business client personally at an extremely well attended conference floor but may not otherwise recognize each other in person, and other similar situations in which a secure meetup is desirable.

SUMMARY

The illustrative embodiments provide a method, system, and computer program product. An embodiment includes a method to generate a mutual navigation route from a first to a second mobile devices, the mutual navigation route defining a route from one of the first and second mobile devices to another of the mobile devices. An embodiment, responsive to determining that the first and second mobile devices reach a predetermined threshold distance between each other, generates a first sensory cue at the first mobile device and a second sensory cue at the second mobile device, the first and second sensory cues being provided in counterpart.

An embodiment includes a method to generate, at a first mobile device, a mutual navigation route from the first to a second mobile device, the mutual navigation route defining a route from the first and second mobile devices to another of the mobile devices. An embodiment transmits the mutual navigation route to the second mobile device. An embodiment initiates, responsive to determining that the first and second mobile devices reach a predetermined threshold distance between each other, generation of a first sensory cue at the first mobile device and a second sensory cue at the second mobile device, the first and second sensory cues being provided in counterpart.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3A depicts a block diagram of an example configuration for mobile device navigation with identification of a counterpart mobile device;

DETAILED DESCRIPTION

Figure 1:
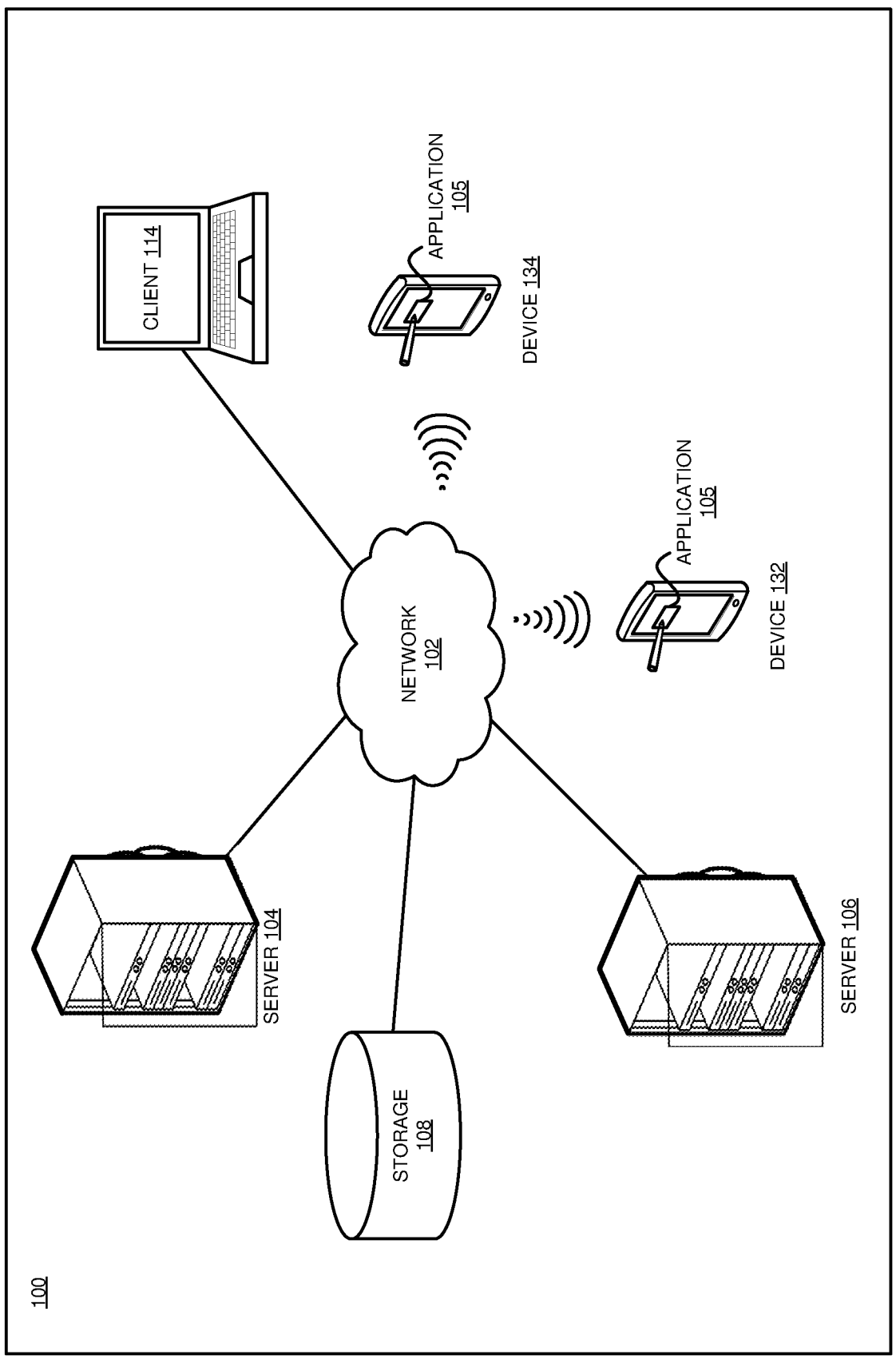
FIG. 1 depicts a block diagram of a network of data processing systems in which illustrative embodiments are implemented.

The illustrative embodiments recognize that there is a need for providing users carrying mobile devices with the capability, to navigate along a mutual navigation route towards each other, then securely and confidently identify that particular other mobile device upon reaching sufficiently close proximity, via a sensory cue rendered at the respective mobile devices along that mutual navigation route. In some embodiments, the mobile devices may be unrelated with no prior history of communication exchanges or transmissions amongst each other, further underscoring the need for any meetup to be conducted with personal security foremost. An initiating user at a first mobile device may request and obtain permission from another user of a target identified mobile device, or counterpart mobile device as referred to herein, prior to generating the mutual navigation route.

The term mutual navigation route as used herein refers to a logistical route or path linking each mobile device to the other, along which each user progressively navigates towards the other, culminating at a common meeting location. The scope of mutual navigation route herein may be a direct route, or a route that circumnavigates physical infrastructure and obstacles so long as the net result is reducing the distance between the devices, culminating in a meeting location or position. Mutual navigation herein includes both mobile devices navigating towards each other, and also only one device navigating towards the other, even as the latter remains stationary. The scope of the mutual navigation includes, but is not necessarily limited to, between users of mobile devices in a pedestrian context, or where at least one of the mobile devices is carried or otherwise associated with a vehicle.

A sensory cue as used herein refers to rendering a feature, via a user interface component of a mobile device, that is perceivable by a user in a manner that signals a change of condition to a user of the mobile device. In embodiments, the user interface component is, but not limited to, an audio rendition, an image display rendition, or a vibration that a user perceives. In some examples, the sensory cue is rendered at the mobile devices once they have arrived with a predetermined distance of each other along the mutual navigation path.

Many presently-available mobile devices, including but not limited to handheld devices, such as smartphones, and wearable devices such as smart watches, already incorporate global positioning system (GPS), wireless communication and inertial navigation (gyroscope, accelerometer) sensor device-based navigation capability. The illustrative embodiments recognize that using presently-available hardware eliminates a need for a custom-built apparatus. However, presently-available hardware simply utilizes such navigation capability on a generally stand-alone basis, and does not identify a previously unrelated mobile device along a mutual navigation route based on counterpart sensory cues rendered at the mobile devices along the navigation route.

The illustrative embodiments recognize that the presently available tools or solutions do not address these needs or provide adequate solutions for these needs. The illustrative embodiments used to describe the invention generally address and solve the above-described problems and other problems related to identifying a counterpart mobile device along a mobile devices' mutual navigation route in a manner that preserves and even enhances the personal security of mobile device users.

An embodiment can be implemented as a software application. The application implementing an embodiment can be configured as a modification of an existing mobile device navigation system, as a separate application that operates in conjunction with an existing mobile device navigation system, a standalone application, or some combination thereof. In particular, one embodiment can be implemented in a client-server form where both devices communicate with each other via an intermediary server which facilitates the communication. Another embodiment implements a direct device-to-device communication method.

Particularly, some illustrative embodiments provide a method that configures two different mobile devices, then uses the configured devices to render a mutual navigation route with identification of a counterpart mobile device.

Another illustrative embodiment provides a method in which a first mobile device generates a mutual navigation route from the first to a second mobile device that defines a route between the first and second mobile devices. The first mobile device transmits the mutual navigation route to the second mobile device. The first mobile device then initiates, responsive to determining that a predetermined threshold distance between the first and second mobile devices is reached, generation of a first sensory cue at the first mobile device and a second sensory cue at the second mobile device, the first and second sensory cues being provided in counterpart. The manner of generating a mutual navigation route and identifying a counterpart mobile device described herein is unavailable in the presently available methods in the technological field of endeavor pertaining to mobile device navigation. A method of an embodiment described herein, when implemented to execute on a device or data processing system, comprises substantial advancement of the functionality of that device or data processing system in generating and rendering a mutual navigation route, in conjunction with using generated sensory cues to identify a counterpart mobile device.

The illustrative embodiments are described with respect to certain types of mobile devices, mobile device sensors and wireless data transmission, user interface sensory cues including display images and audible tones, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
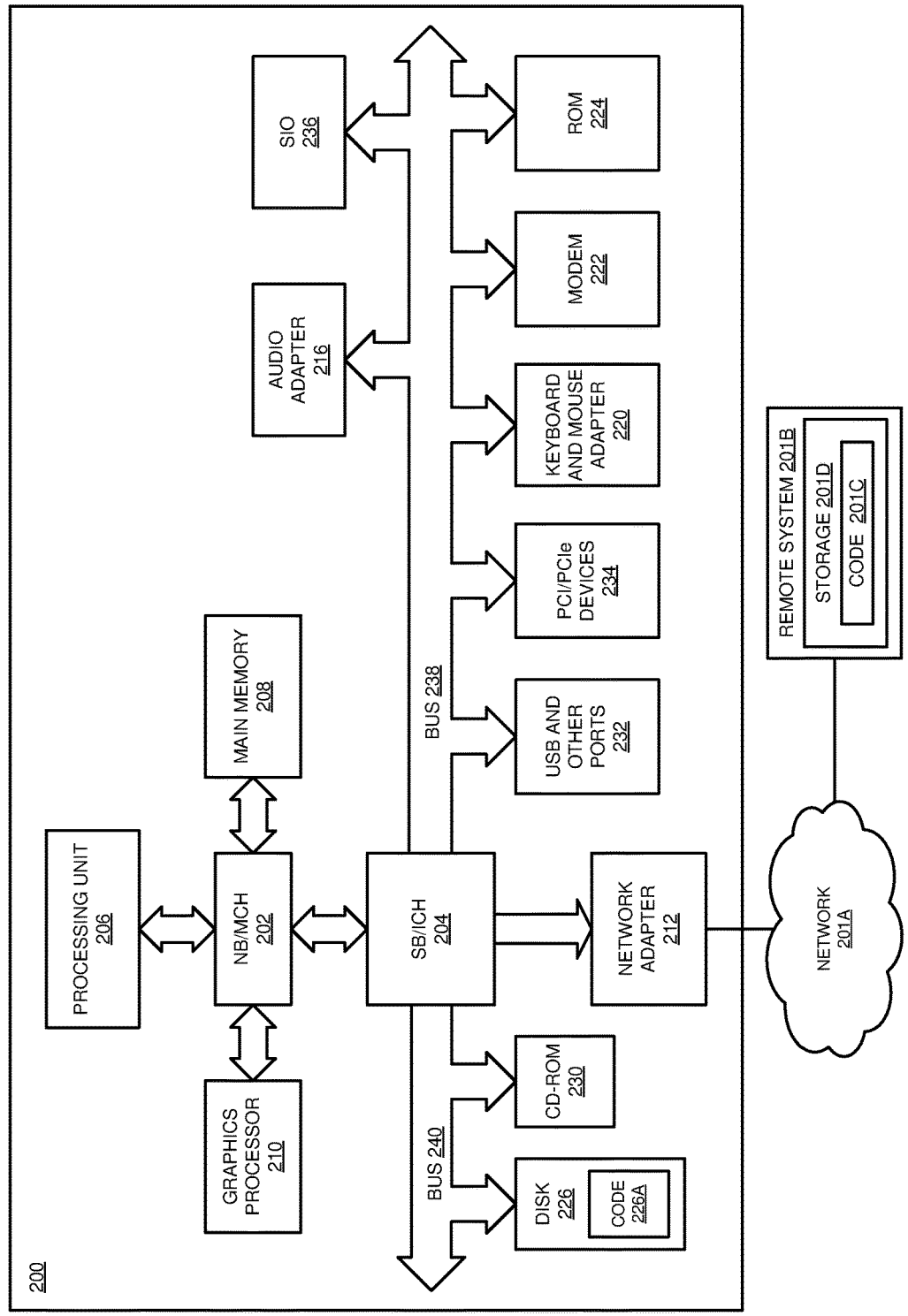
FIG. 2 depicts a block diagram of a data processing system in which illustrative embodiments are implemented.

With reference to the figures and in particular with reference to FIGS. 1 and 2, these figures are example diagrams of data processing environments in which illustrative embodiments are implemented. FIGS. 1 and 2 are only examples and are not intended to assert or imply any limitation with regard to the environments in which different embodiments are implemented. A particular implementation may make many modifications to the depicted environments based on the following description.

FIG. 1 depicts a block diagram of a network of data processing systems in which illustrative embodiments are implemented. Data processing environment 100 is a network of computers in which the illustrative embodiments are implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Client 114 is also coupled to network 102. A data processing system, such as server 104 or 106, or client 114 may contain data and may have software applications or software tools executing thereon.

Only as an example, and without implying any limitation to such architecture, FIG. 1 depicts certain components that are usable in an example implementation of an embodiment. For example, servers 104 and 106, and client 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, and 114 also represent example nodes in a cluster, partitions, and other configurations suitable for implementing an embodiment.

Devices 132, 134 are examples of a device mobile devices described herein. For example, device 132, 134 can take the form of a smartphone, a tablet computer, a laptop computer, client 110 in a portable form, a wearable computing device, or any other suitable device. Any software application described as executing in another data processing system in FIG. 1 can be configured to execute in devices 132, 134 in a similar manner. Any data or information stored or produced in another data processing system in FIG. 1 can be configured to be stored or produced in device 132, 134 in a similar manner.

Devices 132, 134 include navigation capability via GPS, wireless communication (including Wi-Fi and Bluetooth) and inertial navigation sensor devices (accelerometer, gyroscope) incorporated therein. Devices 132, 134 include user interfaces capability such including rendering of sensory feedback or inputs to a user, including display images and audio.

Application 105 implements an embodiment described herein. Application 105 can execute in devices 132, 134, implementing the navigation and user interface capability for identifying counterpart devices along a mutual navigation route. Servers 104 and 106, storage unit 108, and client 114 may couple to network 102 using wired connections, wireless communication protocols, or other suitable data connectivity. Client 114 may be, for example, a portable personal computer.

In the depicted example, server 104 provides data, such as boot files, operating system images, and applications to client 114. Client 114 and devices 132, 134 may be clients to server 104 in this example. Client 114 as well as devices 132, 134 may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

FIG. 2 depicts a block diagram of a data processing system in which illustrative embodiments are implemented. Data processing system 200 is an example of a computer, such as servers 104 and 106, or client 114 in FIG. 1, or another type of device in which computer usable program code or instructions implementing the processes may be located for the illustrative embodiments.

Data processing system 200 is also representative of a data processing system or a configuration therein, such as data processing system 100 in FIG. 1 in which computer usable program code or instructions implementing the processes of the illustrative embodiments may be located. Data processing system 200 is described as a computer only as an example, without being limited thereto. Implementations, in whole or only in part, in the form of other devices, such as devices 132, 134 in FIG. 1, may modify data processing system 200, such as by adding a display, touch interface, or an audio interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1 and application 302 in FIG. 3A, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or smartphone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

FIG. 3A depicts a block diagram of an example configuration for mobile device navigation with identification of a counterpart mobile device in accordance with an illustrative embodiment. Application 302 executes in any of servers 104 and 106, client 114, and mobile devices 132, 134 in FIG. 1, the servers providing an intermediary between the mobile devices 132, 134. Application 302 configures mutual navigation route generation module 312, upon receiving an indication that a request generated by a first mobile device is accepted at a second mobile device, to generate a mutual navigation route from the first to the second mobile devices.

Application 302 configures mobile device sensory cues trigger module 314, upon determining that the mobile devices reach a predetermined threshold distance during mutual navigation, to initiate generation of a first sensory cue at the first mobile device and a second sensory cue at the second mobile device. The first and second sensory cues are provided in counterpart portions that complete each other, in some embodiments. In performing the functions in accordance with mutual navigation route generation module 312 and sensory cues trigger module 314, application 302 utilizes wirelessly transmitted data received via interface 304 from mobile devices, and in turn transmits wireless data via interface 306 to the mobile devices.

Mutual navigation route generation module 312, in some includes a mapping capability to generate a route between the mobile devices, as any one device navigates towards the other. Mobile devices 132, 134 includes sensors for a received signal strength (RSS), a magnetic direction, an inertial parameter, and a global positioning system (GPS) signal, and transmit their respective current positions, in terms of position coordinates in some embodiments, to application 302 at the intermediary server 304, 306. Mutual navigation route generation module 312 also accesses an infrastructure layout map may of the surrounding premises or area encompassed by the mobile devices. Mutual navigation route generation module 312 generates the mutual navigation route based on the determined positions of the mobile devices 132, 134 in conjunction with a viable path between the devices. The viable path avoids obstacles, and in some embodiments, conforms to an existing path in accordance with the infrastructure layout map.

Figure 3B:
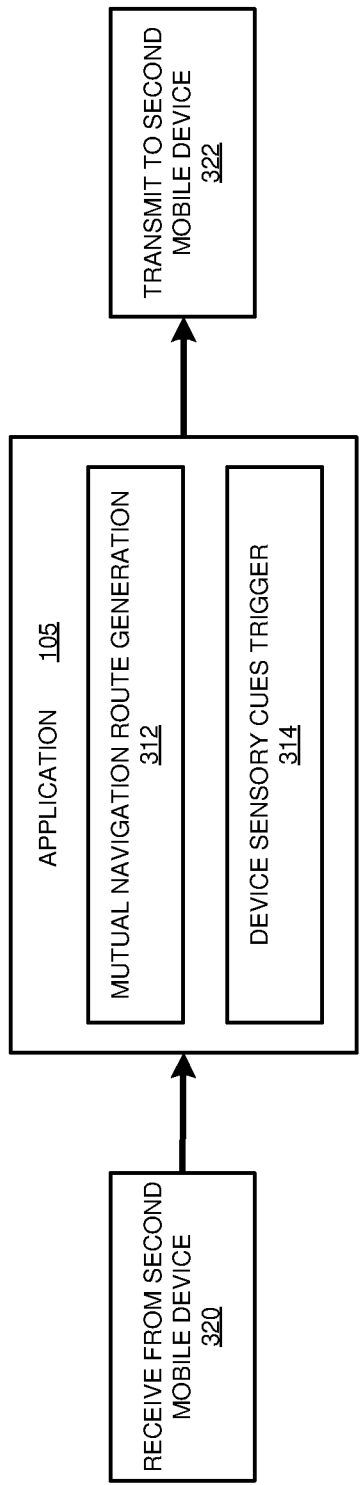
FIG. 3B depicts a block diagram of a further example configuration for mobile device navigation with identification of a counterpart mobile device.
Figure 4:
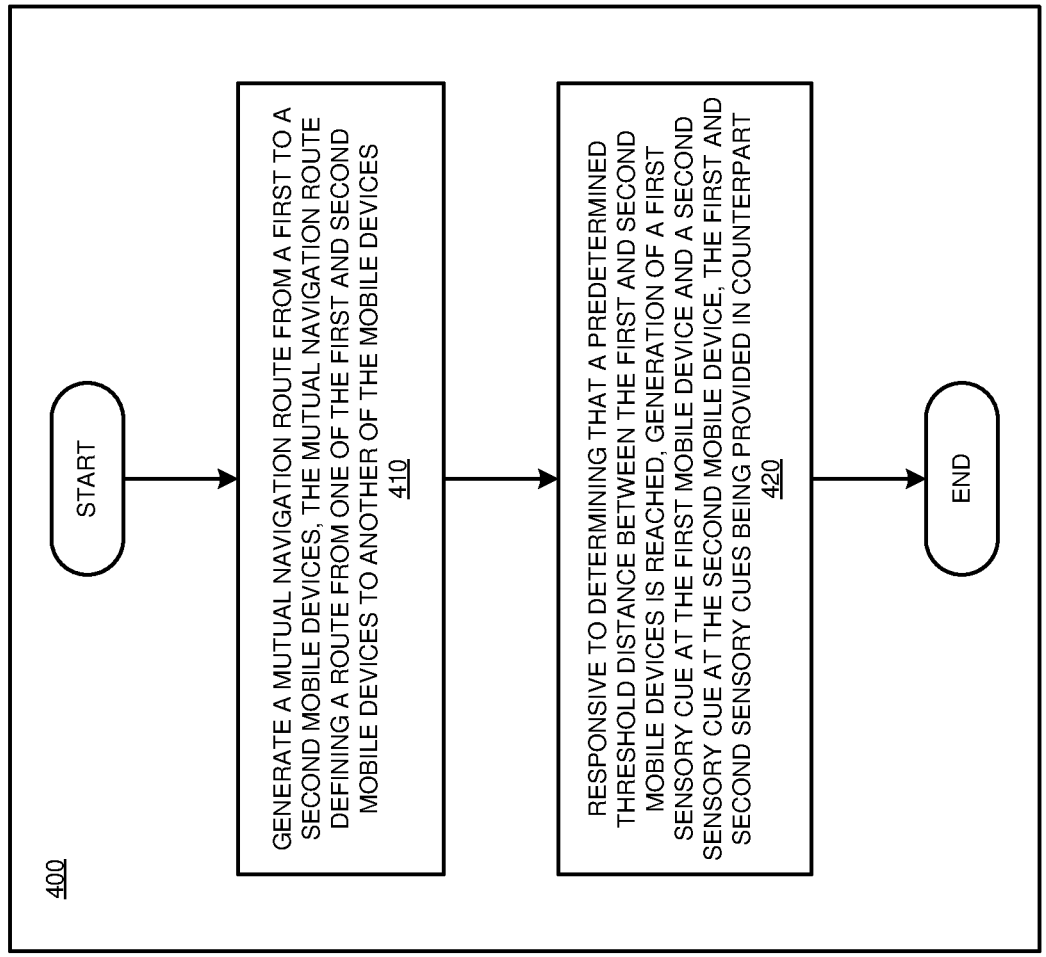
FIG. 4 depicts a flowchart of an example process for mobile device navigation with identification of a counterpart mobile device.

FIG. 3B illustrates a block diagram of another example embodiment that does not implement an intermediary server between the mobile devices 132, 134. The first mobile devices initiates or causes configuration of the second mobile device in accordance with mutual navigation route generation module 312 and sensory cues trigger module 314. Application 302 utilizes wirelessly transmitted data received from, and transmitted to, the second mobile device via interface 320, 322 between the mobile devices. In this embodiment, the first mobile device generates a mutual navigation route from the first to a second mobile device. The mutual navigation route defines a route from each mobile device to the other. The first mobile device transmits the mutual navigation route to the second. The first mobile device initiates, responsive to determining that the first and second mobile devices reach a threshold distance apart, generation of a first sensory cue at the first mobile device and a second sensory cue at the second mobile device, the first and second sensory cues being provided in counterpart. In the example of FIG. 3B, without any intermediary server, application 105 incorporates the mapping functionality performed by server 304, 306 as discussed above with regard to FIG. 3A. In particular, application 105 includes a mapping capability to generate a route between the mobile devices, as any one device navigates towards the other. Mobile devices 132, 134 includes sensors for a received signal strength (RSS), a magnetic direction, an inertial parameter, and a global positioning system (GPS) signal. The targeted device, or second mobile device as referred to in embodiments herein, transmits its current positions to application 105 at first, or initiating, mobile device. Mutual navigation route generation module 312 also accesses an infrastructure layout map may of the surrounding premises or area encompassed by the mobile devices. Mutual navigation route generation module 312 generates the mutual navigation route based on the determined positions of the mobile devices 132, 134 in conjunction with a viable path between the devices. The viable path avoids obstacles, and in some embodiments, conforms to an existing path in accordance with the infrastructure layout map FIG. 4 depicts a flowchart of an example process for mobile device navigation with identification of a counterpart mobile device.

At block 410, application 302 configures mutual navigation route generation module 312 to generate a mutual navigation route from the first to the second mobile devices. In some embodiments, the server generates the mutual navigation route only when a request for a meetup, offered by the first mobile device, is accepted at the second mobile device. In embodiments, the request initiated at a first mobile device may access and select an identifier associated with the second mobile device, such as a phone number, and email, texting address or an identifier associated with a social application account of the second, or target, mobile device. The request is transmitted to the target mobile device either directly or indirectly using available wireless communications, including, but not limited to, internet communication. In some embodiments, the target mobile device needs to communication an express acceptance of the request initiated at the first mobile device, before a mutual navigation route is generated, either via the intermediary server configuration of FIG. 3A or the device-to-device configuration of FIG. 3B.

In some embodiments, the mutual navigation route comprises a direct path from the first to the second mobile devices. The mutual navigation route utilizes a direct path, for example, where large crowds are present but no physical barriers or detours are implicated during mutual navigation of the mobile devices towards each other.

In other embodiments, application 302 accesses an infrastructure layout of the surrounding infrastructure or area that at least partially encompasses the mutual navigation route, and generating the mutual navigation route based on a detour around physical infrastructure features, such as walls or other barriers, indicated in accordance with the infrastructure layout of the area.

In some embodiments, users of mobile devices may prefer mutually navigating to a preferred location. In such cases, application 302 accesses a database of historically preferred meeting locations in proximity to the first and second mobile devices, selecting one of the historically preferred meeting locations, and generate the mutual navigation route in accordance with such preferred meeting locations.

In yet other embodiments, application 302 causes generating of the mutual navigation route based upon acquiring received signal strengths (RSS), magnetic compass direction, inertial parameters received from mobile devices such as gyroscope and accelerometer measurements, and global positioning system (GPS) signals from respective sensor devices of the mobile devices.

At block 420, application 302 configures sensory cues trigger module 314 to, responsive to determining that a predetermined threshold distance between the first and second mobile devices is reached, generate a first sensory cue at the first mobile device and a second sensory cue at the second mobile device. The first and second sensory cues are provided in counterparts that complement each other.

In an embodiment, application 302 initiates generation of the second sensory cues in accordance with at one or more of an audio file and a display image file transmitted to the respective mobile devices respectively. In other embodiments, the sensory cue comprises the display image file and the counterpart comprises any one of a counterpart display image portion of a composite image display, and a common display image object that includes at least a different display image attribute. In additional variations, the sensory cue comprises the audio file, and the counterpart comprises a rendition of the audio file in sequential counterpart portions.

Figure 5:
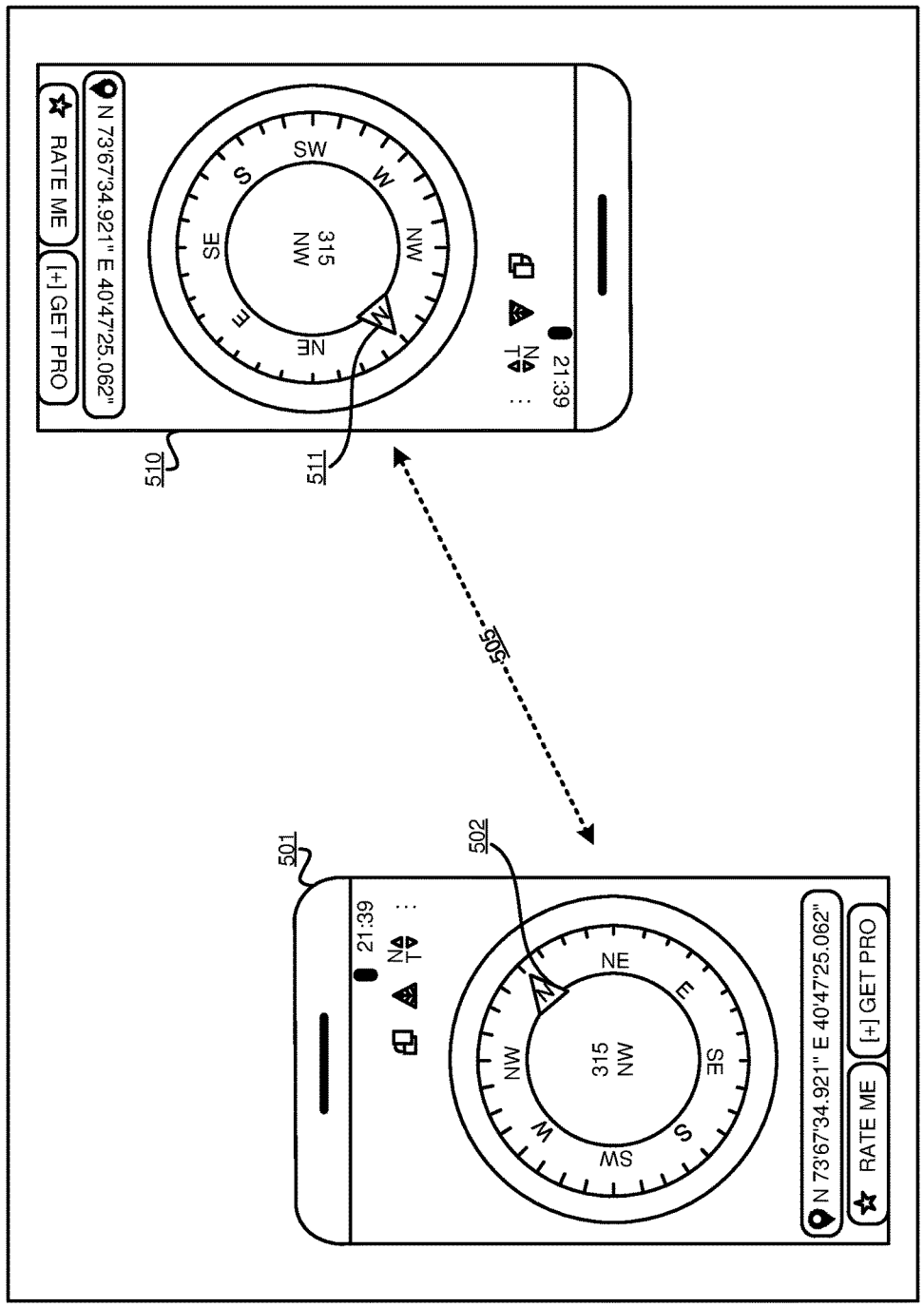
FIG. 5 depicts an example of mobile device display images rendered along a mutual navigation route.

FIG. 5 depicts an example of mobile device display images rendered along a mutual navigation route in accordance with an illustrative embodiment. In particular, the example can be executed using application 302 in FIG. 3. Display image 501 at a first mobile device includes a directional navigation aid 502, a compass arrow in the embodiment depicted, directing a user of the mobile device along the mutual navigation route 505. Similarly, display image 510 provided at the counterpart mobile device along the mutual navigation route directs that respective user via directional navigation aid 511 along the mutually navigated route 505.

Figure 6A:
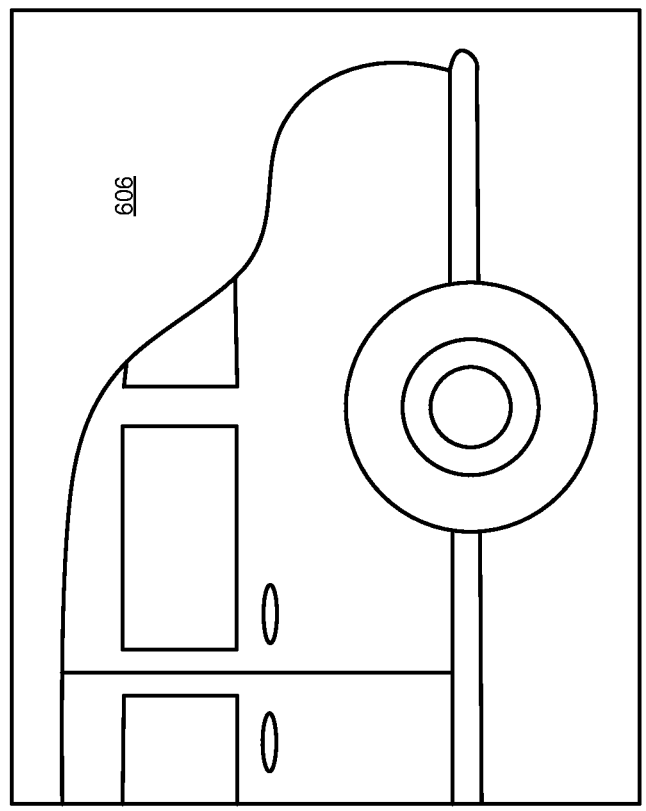
FIG. 6A depicts an example of a mobile device display image in counterpart.
Figure 6A:
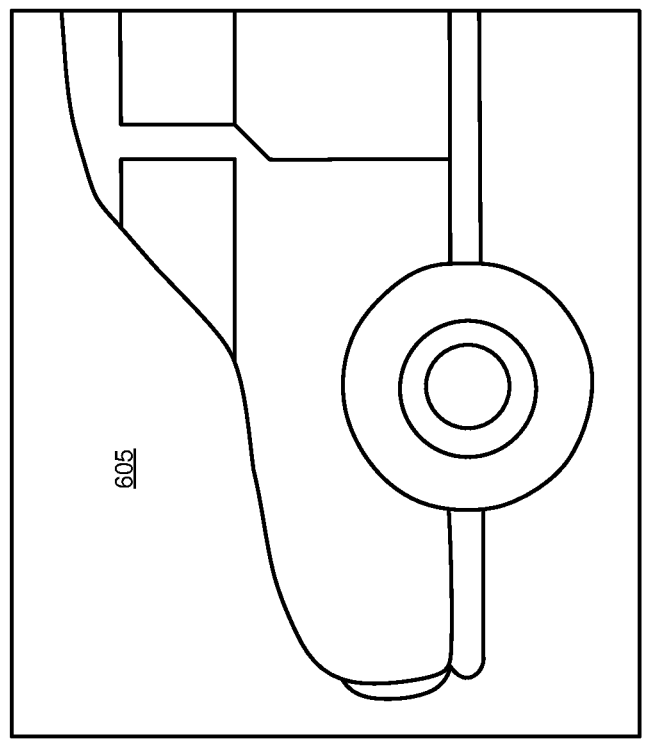
Figure 6B:
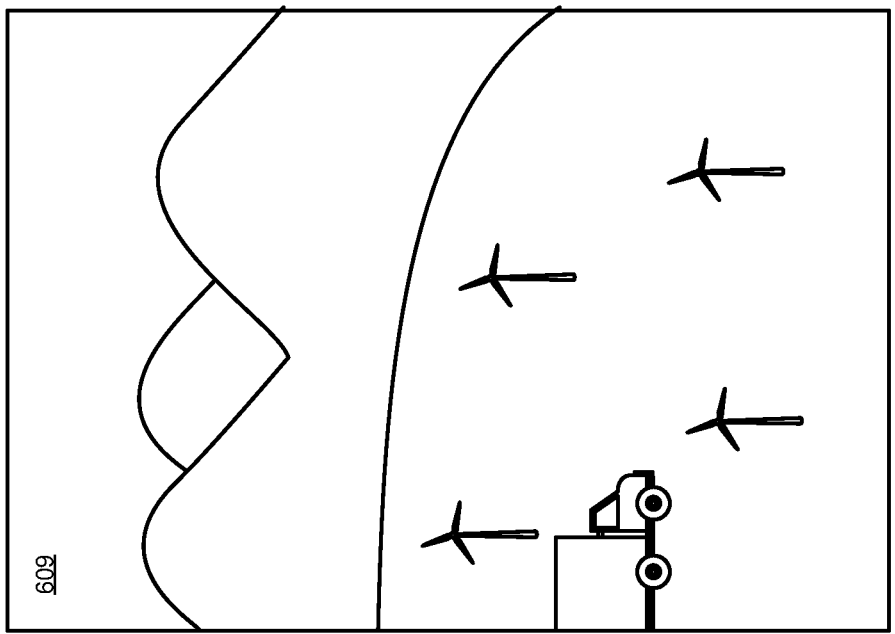
FIG. 6B depicts a further example of a mobile device display image in counterpart.
Figure 6B:
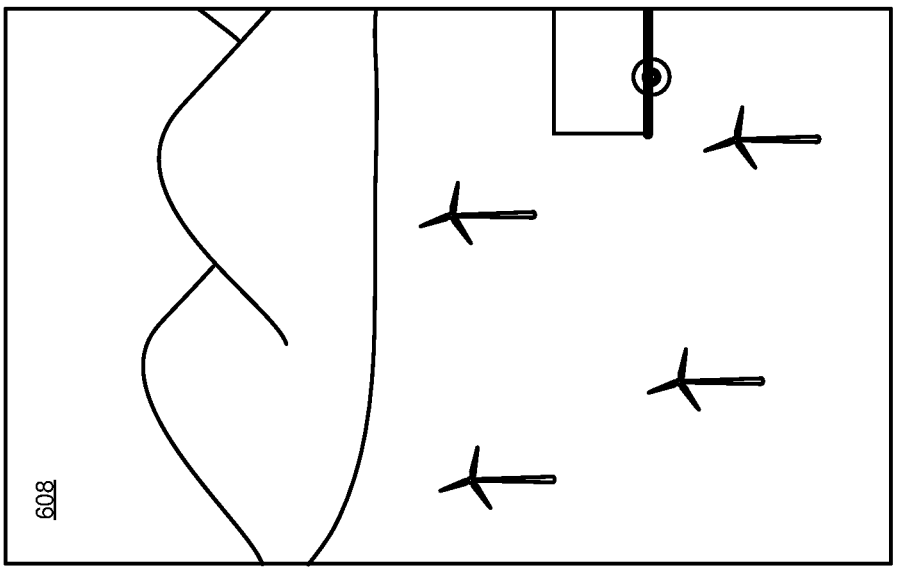

FIGS. 6A-6B depict examples of display images rendered at counterpart mobile devices along a mutual navigation route. For example, once the mobile devices are detected as being in close proximity, the first and second sensory cues provided in counterparts, in accordance with sensory cues trigger 314 of application 302, comprises a complementary display image portion of a composite image display as depicted in FIG. 6A, and in FIG. 6B. In some embodiments, such as for pedestrian navigation between both mobile devices, a threshold proximity defining close proximity as used here is predetermined as about 10 feet of separation between the mobile devices. In other embodiments, such as involving a vehicle navigation for at least one of the mobile devices, close proximity is established as about 25 feet. In embodiments herein, such counterpart images are used by the respective mobile device user to identify the other mobile device as the counterpart device involved in the mutual navigation. An embodiment, depicted in FIG. 6A, depicts complementary display image portions respectively at each device, that when taken together, form a complete composite image display. For example, complementary portions 605, 606 may form a complete car or similar vehicle when taken together in composite effect from each respective display image portion of counterpart mobile devices. In this embodiment, a display portion at a first mobile device complements or completes another display portion at the second mobile device, such that when combined, the display portions form a recognizable composite image to a user.

In another embodiment, depicted in FIG. 6B, complementary image portions 608, 609 are displayed. The complementary image portions 608, 608 are complementary image portions of a same composite scene. The scene may be displayed with identical or continuously varying colors, textures, shading and similar other image attributes that readily indicate or represent to a viewer or mobile device user that the respective mobile devices are counterparts. In other examples, the image attribute of the same composite image as rendered for display at respective mobile devices is different in terms of a color, a size, a background visual effect, etc.

Figure 7:
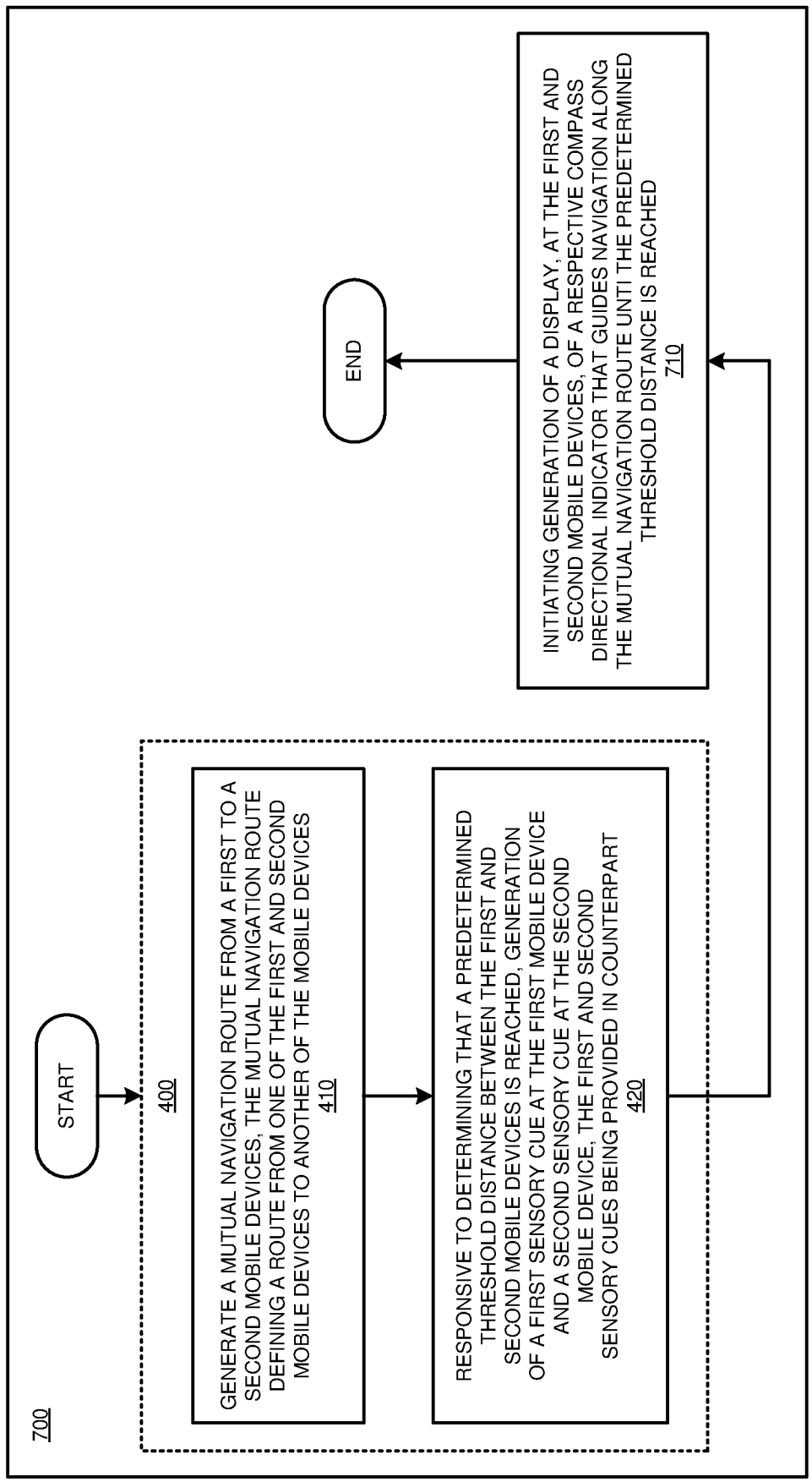
FIG. 7 depicts a flowchart of an example process for mobile device navigation along a mutual navigation route.

FIG. 7 depicts a flowchart of an example process for mobile device navigation along a mutual navigation route in accordance with an illustrative embodiment. Process 700 can be implemented using application 302 in FIG. 3, in conjunction with process 400 as depicted in FIG. 400.

In block 710, the application 302 configures mutual navigation route generation module 312 to initiate generation of a display, at the first and second mobile devices, of a respective compass directional indicator that guides navigation along the mutual navigation route until a predetermined threshold distance is reached.

Figure 8:
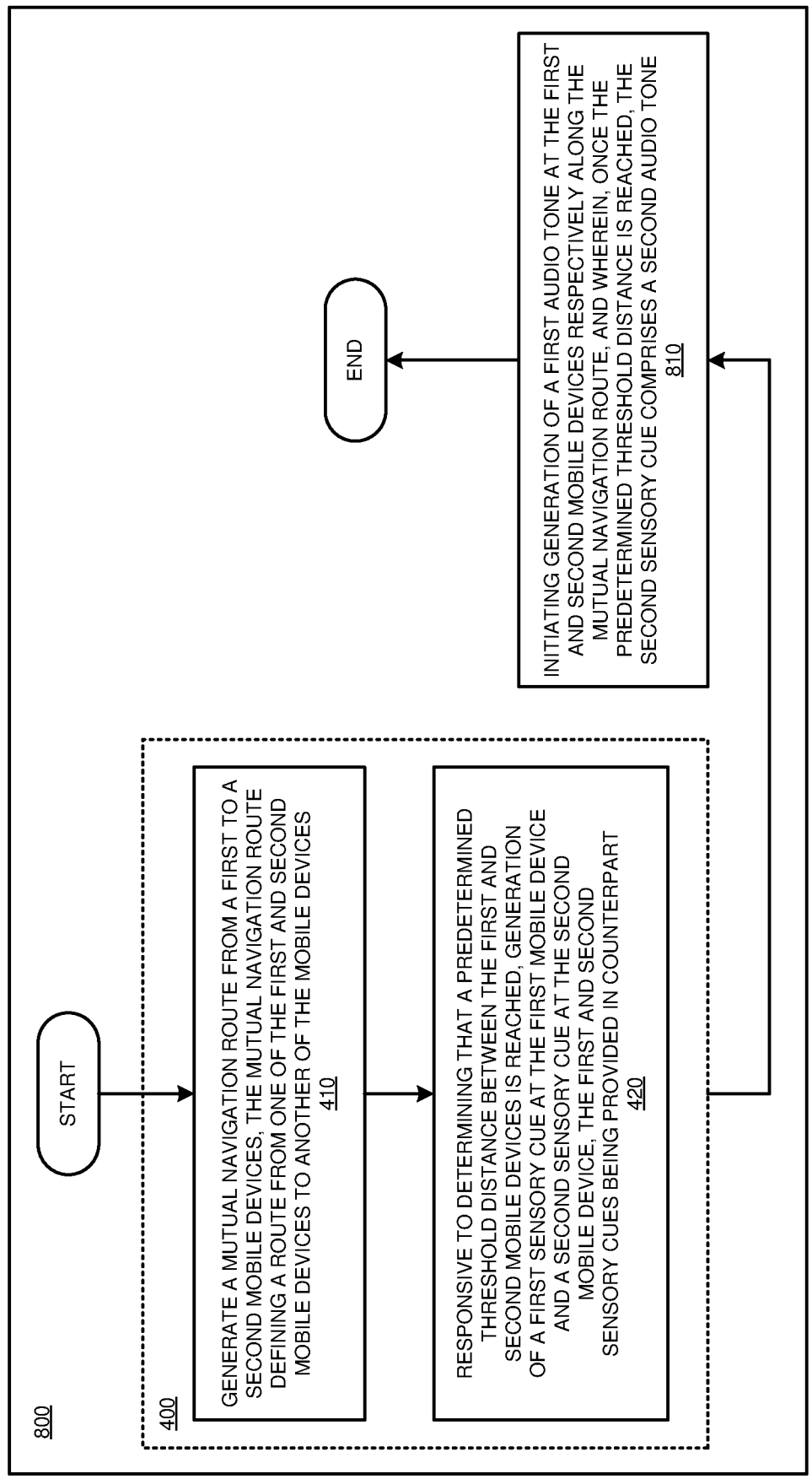
FIG. 8 depicts a flowchart of an example process for mobile device navigation with identification of a counterpart mobile device.

FIG. 8 depicts a flowchart of an example process for mobile device navigation with identification of a counterpart mobile device in accordance with an illustrative embodiment. Process 800 can be implemented in application 300 in FIG. 3, in conjunction with process 400 as depicted in FIG. 4.

In block 802, the application 302 configures sensory cues trigger module 314 to initiate generation of a first audio tone at the first and second mobile devices respectively along the mutual navigation route, and wherein, once the predetermined threshold distance is reached, the second sensory cue comprises a second audio tone. For example, the first tone may be a beep, which is rendered with continuously increasing periodicity as the mobile devices progress towards each other, and changes to a continuous audible tone once the predetermined threshold proximity is reached.

In related embodiments, after recommending a mutual navigation route or a preferred meeting location route, the application 302 monitors the performance to determine if the parties as represented by the respective mobile devices connected, such as via user feedback. For example, if one of the parties expresses negative sentiment about a particular mutual navigation instance or meeting location, this is taken into consideration in scoring and weighting meetup locations related to a locality or infrastructure. For instance, a meetup location which is a crowded exhibit hall might be selected based on previous exhibit hall scores or related to with positive or negative user sentiment based on historical or cumulative user experiences. Factors such as the time of day may be considered and compared to user preferences. For example, desolate night time locations may be associated with negative user feedback and detected based on negative user feedback, or sentiment expressed using sentiment analysis.

Thus, a computer implemented method, system or apparatus, and computer program product are provided in the illustrative embodiments for mobile device navigation with counterpart device identification and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, when executed using a processor and a memory, causing operations comprising:
    accessing a database of historically preferred meeting locations proximate a first mobile device and a second mobile device;
    selecting one of the historically preferred meeting locations;
    generating a mutual navigation route from the first mobile device to the second mobile device in accordance with the selected one of the preferred meeting locations, the mutual navigation route defining a route from one of the first and second mobile devices to another of the mobile devices; and
    initiating, responsive to determining that a predetermined threshold distance between the first and second mobile devices is reached, generation of a first sensory cue at the first mobile device and a second sensory cue at the second mobile device, the first and second sensory cues being provided in counterpart.

2. The computer-implemented method of claim 1, further comprising initiating generation of the first and second sensory cues in accordance with at least one of an audio file and a display image file provided at the first and second mobile devices.

3. The computer-implemented method of claim 2 wherein the sensory cue comprises the display image file, and the counterpart comprises at least one of: a counterpart display image portion of a composite image display, and a common display image object that includes at least a different display image attribute.

4. The computer implemented method of claim 2 wherein the sensory cue comprises the audio file, and the counterpart comprises a rendition of the audio file in sequential counterpart portions.

5. The computer-implemented method of claim 1, further comprising:
   accessing an infrastructure layout of an area that at least partially encompasses the mutual navigation route; and
   generating the mutual navigation route based on a detour around at least one physical infrastructure feature indicated in accordance with the infrastructure layout of the area.

6. The computer-implemented method of claim 1, further comprising generating the mutual navigation route based upon acquiring at least one of a received signal strength (RSS), a magnetic direction, an inertial parameter, and a global positioning system (GPS) signal from respective sensor devices of the first and second mobile devices.

7. The computer-implemented method of claim 1, further comprising:
   initiating generation of a display, at the first and second mobile devices, of a respective compass directional indicator that guides navigation along the mutual navigation route until the predetermined threshold distance is reached.

8. The computer-implemented method of claim 1, further comprising:
   initiating generation of a first audio tone at the first and second mobile devices respectively along the mutual navigation route, and wherein, once the predetermined threshold distance is reached, the second sensory cue comprises a second audio tone.

9. A computer usable program product comprising one or more computer-readable storage devices, and program instructions stored on at least one of the one or more storage devices, the stored program instructions being executable by a processor to cause operations comprising:
   accessing a database of historically preferred meeting locations proximate a first mobile device and a second mobile device;
   selecting one of the historically preferred meeting locations;
   generating a mutual navigation route from the first mobile device to the second mobile device in accordance with the selected one of the preferred meeting locations, the mutual navigation route defining a route from one of the first and second mobile devices to another of the mobile devices; and
   initiating, responsive to determining that a predetermined threshold distance between the first and second mobile devices is reached, generation of a first sensory cue at the first mobile device and a second sensory cue at the second mobile device, the first and second sensory cues being provided in counterpart.

10. The computer usable program product of claim 9, the operations further comprising initiating generation of a first audio tone at the first and second mobile devices respectively along the mutual navigation route, and wherein, once the predetermined threshold distance is reached, the second sensory cue comprises a second audio tone.

11. The computer usable program product of claim 9, the operations further comprising initiating generation of a display, at the first and second mobile devices, of a respective compass directional indicator that guides navigation along the mutual navigation route until the predetermined threshold distance is reached.

12. The computer usable program product of claim 9 further comprising program instructions to initiate generation of the first and second sensory cues in accordance with at least one of an audio file and a display image file provided at the first and second mobile devices.

13. The computer usable program product of claim 12 wherein the sensory cue comprises the display image file, and the counterpart comprises at least one of: a counterpart display image portion of a composite image display, and a common display image object that includes at least a different display image attribute.

14. The computer usable program product of claim 12 wherein the sensory cue comprises the audio file, and the counterpart comprises a rendition of the audio file in sequential counterpart portions.

15. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to access a database of historically preferred meeting locations proximate a first mobile device and a second mobile device;
   program instructions to select one of the historically preferred meeting locations;
   program instructions to generate a mutual navigation route from the first mobile device to the second mobile device in accordance with the selected one of the preferred meeting locations, the mutual navigation route defining a route from one of the first and second mobile devices to another of the mobile devices; and
   program instructions to initiate, responsive to determining that a predetermined threshold distance between the first and second mobile devices is reached, generation of a first sensory cue at the first mobile device and a second sensory cue at the second mobile device, the first and second sensory cues being provided in counterpart.

16. The computer system of claim 15 further comprising program instructions to initiate generation of a first audio tone at the first and second mobile devices respectively along the mutual navigation route, and wherein, once the predetermined threshold distance is reached, the second sensory cue comprises a second audio tone.

17. The computer system of claim 15 further comprising program instructions to initiate generation of a display, at the first and second mobile devices, of a respective compass directional indicator that guides navigation along the mutual navigation route until the predetermined threshold distance is reached.

18. The computer system of claim 15 further comprising program instructions to initiate generation of the first and second sensory cues in accordance with at least one of an audio file and a display image file provided at the first and second mobile devices.

19. The computer system of claim 18 further comprising program instructions to generate the mutual navigation route based upon acquiring at least one of a received signal strength (RSS), a magnetic direction, an inertial parameter, and a global positioning system (GPS) signal from respective sensor devices of the first and second mobile devices.

* * * * *